Figure 3:
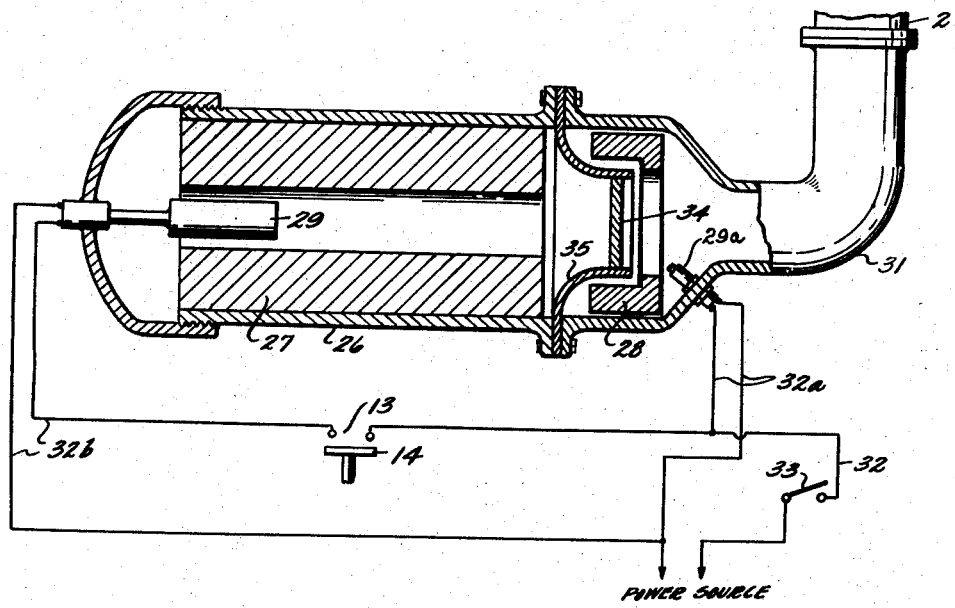

Nov. 24, 1959　　　　　D. J. BLOOMBERG　　　　　2,913,872
SPEED LIMITING ARRANGEMENT FOR TURBINE ROTORS
Filed Oct. 11, 1954　　　　　　　　　　　　　　　2 Sheets-Sheet 1
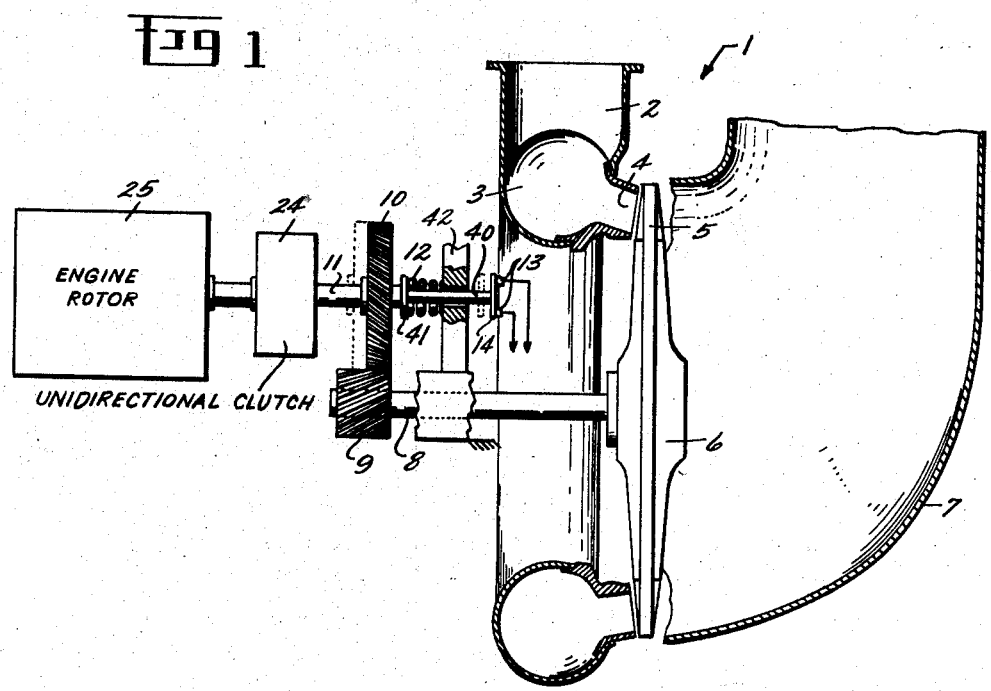
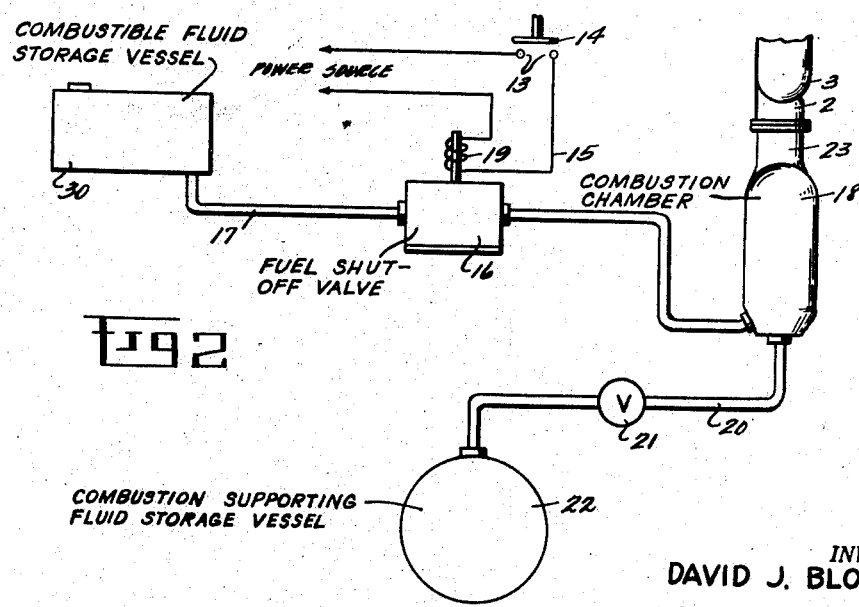
INVENTOR.
DAVID J. BLOOMBERG
BY
　　　*Edward M. Title*
　　　　HIS ATTORNEY—

Nov. 24, 1959     D. J. BLOOMBERG     2,913,872
SPEED LIMITING ARRANGEMENT FOR TURBINE ROTORS
Filed Oct. 11, 1954     2 Sheets-Sheet 2

INVENTOR.
DAVID J. BLOOMBERG
BY
*Edward M. Little*
HIS ATTORNEY —

United States Patent Office 2,913,872
Patented Nov. 24, 1959

2,913,872

SPEED LIMITING ARRANGEMENT FOR TURBINE ROTORS

David J. Bloomberg, Newton, Mass., assignor to General Electric Company, a corporation of New York Application October 11, 1954, Serial No. 461,643

8 Claims. (Cl. 60—39.14)

This invention relates to fluid pressure turbines and particularly to a speed limiting device for a turbomachine. The present invention is especially well suited for use with turbine-type starter motors for internal combustion power plants, although its utility is not limited thereto.

Particularly in aircraft service, it is customary and desirable to provide turbine-type starter motors for the aircraft powerplants which use motive fluid generated by the combustion of a suitable fuel in a confined space so as to form gases under pressure. This type of starter generally comprises a high speed fluid turbine which drives the reciprocating or gas turbine engine through a speed reduction gear train and a unidirectional clutch to accelerate the engine to its starting speed. Since modern aircraft power plants have moving parts of considerable mass, the expenditure of substantial amounts of energy is required in order to effect starting. If, during the starting operation, the starter should not be connected to the engine, as for example, due to a failure of the starter clutch mechanism to engage, or a failure in the driving mechanism, it is necessary to provide quick acting means for preventing overspeeding of the turbine-type starter to a dangerous degree. It is important to limit turbine speed not only to prevent dangerous turbine rotor stresses, but to limit the impact between the clutch members on engagement. In practice, this is a very difficult problem to solve in view of the fact that the physical proportions of the turbine-type starter are usually such that its rotating parts have very little inertia. Therefore, it will be apparent that any device employed to prevent overspeeding of such a turbine-type starter must be capable of acting in a very short time interval. Accordingly, it is an object of this invention to provide an improved speed limiting arrangement which obviates the above-mentioned difficulties.

Another object of the invention is to provide an improved arrangement which will prevent turbine-type starting motors from reaching an unsafe speed, which arrangement is mechanically simple, quick-acting, and light in weight.

Briefly stated, in accordance with one aspect of the invention, a small axial displacement of a member in the gear train is utilized to actuate speed limiting means for the turbine.

Figure 4:
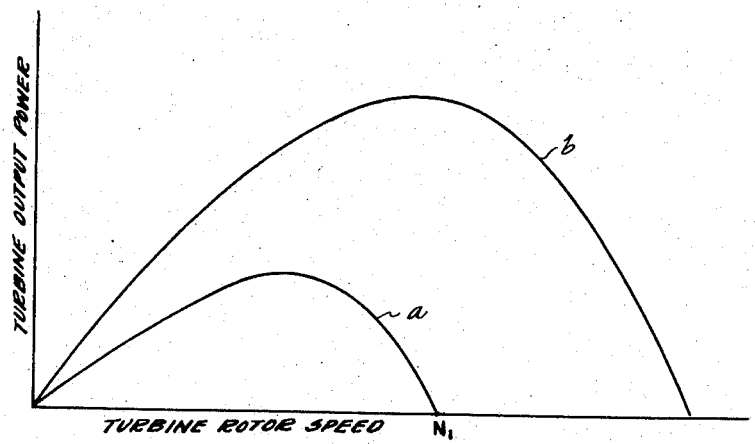

The invention itself, however, both as to its organization and method of operation, together with further objects and advantages thereof, may best be understood by reference to the following description taken in connection with the accompanying drawing in which: Figure 1 is a diagrammatic representation of a turbine starter motor provided with a speed limiting arrangement in accordance with the invention; Figure 2 is a diagrammatic representation of one form of source of motive fluid for a starter motor embodying the invention; Figure 3 shows an alternate form of source of motive fluid and Figure 4 is a curve illustrating some of the operating characteristics of a turbine.

Referring to Figure 1, the turbine starter indicated generally at 1 comprises a turbine having an inlet 2 through which inlet gases under pressure are introduced to a scrolled nozzle box 3. From the nozzle box 3, the gases expand through nozzle 4 and are directed against turbine blades 5 on the rotor 6 before being exhausted through an exhaust casing 7. A rotor shaft 8 may be formed integrally with the rotor 6 as shown or may be secured thereto by suitable key or spline means. The rotor shaft 8 is rotatably mounted in suitable bearings (not shown) which are supported by the starter casing 42. A pinion 9 is secured to the rotor shaft 8 by suitable spline or key means and is adapted to mesh with one or more helical gears 10 in a speed reduction gear train. In Figure 1 the speed reduction gear train is represented by a helical pinion 9 and a meshing output gear 10. Although a single stage reduction gear train is shown in Figure 1, it will be understood that a multiple stage as well as other configurations of a single stage reduction gear train may be used without departing from the scope of the invention. An output shaft 11 is connected to the engine rotor 25 through a unidirectional clutch 24 which allows transmission of torque from the starter to the engine only. One form of such a clutch is described with greater particularity in a copending application of Dallas E. Cain and George H. Fry, Jr., S.N. 326,504, filed December 17, 1952, now Patent 2,752,023, issued June 26, 1956, and assigned to the assignee of the present invention. The output shaft 11 carries the helical gear 10 and is mounted so as to permit limited axial movement of the shaft with respect to the casing 42. An electrical switch comprising normally open contacts 13 is mounted on the starter casing 42 adjacent the shaft 11. Electrical continuity is established between the contacts 13 through a contact arm 14 which is mounted on one end of a moveable stem 40. An actuating disk 41 is fastened to the opposite end of the stem 40. Biasing means such as a spring 12 are provided to bias the switch actuating disk 41 against the end of the shaft 11 and also to bias the shaft 11 away from the turbine rotor 6, thereby biasing the contact arm 14 away from the contacts.

Several types of systems are commonly used for generating motive fluid for the turbine-type starter. One such system uses the combustion of liquid fuel and compressed air or other combustion supporting fluid as a source of motive fluid. Figure 2 shows a system of this type. Motive fluid for driving the turbine is generated in a combustion chamber 18 which is delivered under pressure and at elevated temperatures to the turbine inlet 2 through a conduit 23. The motive fluid is generated by burning fuel which is mixed with a combustion supporting fluid such as air or oxygen in the combustion chamber 18. The air or other combustion supporting fluid may be supplied by a storage bottle 22 of a well-known type used for the storage of air, oxygen, nitrogen, acetylene, or other fluids under high pressures. Communication is established between the combustion supporting fluid supply 22 and the combustion chamber 18 by the provision of conduit 20 including an air shut-off valve 21. A combustion system of this type is described with greater particularity in a copending application of William F. Ehorn, S.N. 226,906, filed May 17, 1951, now Patent 2,754,657, issued July 17, 1956, and assigned to the assignee of the present application.

Referring to Figures 1 and 2, the switch contacts 13 are connected electrically in series with a source of electrical energy and a solenoid 19 associated with a fuel shut-off valve 16 by electrical conductors 15. The fuel shut-off valve 16 is connected to a fuel conduit 17, between a fuel storage vessel 30 and the combustion chamber 18. The shut-off valve 16 is of a well-known type including a solenoid 19 to open the valve in response to electrical voltage which may be applied to the solenoid and also including means biasing the valve to the closed position when no voltage is applied to the solenoid 19.

To understand the operation of the system, it is necessary to first understand certain of the operating characteristics of the turbine. Referring to Figure 4, two curves are shown which illustrate the output power of a turbine in terms of turbine rotor speed and the energy content of the motive fluid. The curve marked "a" represents the relationship between turbine output power and turbine rotor speed when the motive fluid supplied to the turbine has a low energy content. The curve labeled "b" shows the same relationship corresponding to a high energy content in the gases supplied to the turbine. In general, it can be said that the energy content of the motive fluid is high when the pressure and temperature of the fluids are high and, conversely, the energy content of the motive fluid is low when the pressure and temperature of the fluid are low.

Comparing the curves "a" and "b" of Figure 4, it will be noted that with motive fluid having low energy content, the turbine output power peaks and falls off to zero at a low value of rotor speed relative to the same occurrence when the motive fluid has a high energy content. In order to provide a high output unit, the turbine is designed to operate safely at speeds at least as high as that corresponding to that at which peak power output is obtained with high fluid energies. Referring to curve "a," it follows that the turbine cannot reach an unsafe speed when the energy content of the motive fluid is low. It will be understood that the curves of Figure 4 show only a general relationship and that the exact relationship depends upon many design variables which differ from one application to the next.

To initiate the engine starting cycle, the shut-off valve 21 is opened to allow combustion supporting fluid to flow under pressure from the storage vessel 22 through conduit 20, the combustion chamber 18 and conduit 23 to the turbine inlet 2. As no fuel is being introduced into the combustion chamber at this time, no combustion takes place and consequently the energy content of the fluid at the turbine inlet 2 is low. The corresponding power output-speed relationship is then that indicated by curve "a" of Figure 4, and consequently the maximum speed that can be developed is that which is indicated as $N_1$. Since this speed is considerably lower than the maximum design speed, a dangerous overspeed condition cannot obtain so long as there is no combustion in the chamber 18. Normally the clutch 24 will be engaged as soon as the starter begins to rotate so that the turbine output shaft 11 is connected to the engine rotor 25. As soon as the clutch 24 is engaged, torque will then be transmitted through the gears 9 and 10. It is well-known that whenever a torque is transmitted between two meshing helical gears, an axial component of reaction force will result. The normal direction of rotation of the turbine rotor 6 in Figure 1 is counterclockwise when viewed from the downstream or exhaust end so that the reaction forces when the turbine rotor delivers power to the engine rotor are such as to tend to move the rotor shaft 8 away from the turbine exhaust 7 or in an upstream direction and to move the gear shaft 11 axially in the opposite direction. Since the rotor shaft 8 is supported so as to permit limited axial movement, the reaction forces will cause the shaft 11 to move against the restraining force of the spring 12. As the shaft 11 moves in the downstream direction, it depresses the switch contact button 14 so that the electrical contacts of the switch 13 are closed. Closing the switch 13 causes the electrical circuit, including the solenoid 19 and electrical energy source, to be completed energizing the solenoid 19 thereby opening the fuel shut-off valve 16 to allow fuel to flow under pressure through the fuel conduit 17 into the combustion chamber 18. Suitable ignition means (not shown) associated with the combustion chamber 18 causes the mixture of fuel and combustion supporting fluid to be ignited therein. Once combustion is established in the chamber 18, the turbine output power vs. speed characteristic of the unit corresponds to that indicated by curve "b" in Figure 4. Under these conditions, a relatively large turbine output power is available to accelerate the engine rotor 25 to its starting speed.

In the case of starting a jet engine, the engine rotor must be accelerated to a certain minimum speed known as the "self-sustaining" speed before the power delivered by the engine turbine is equal to the power consumed by the engine compressor. At speeds greater than the "self-sustaining" speed, the shaft output power of the jet engine turbine exceeds the power absorbed by the engine compressors so that the engine can then accelerate under its own power. The normal practice, then, is to accelerate the engine to a speed somewhat in excess of the "self-sustaining" speed of the engine by means of the starter and then to cut off the flow of motive fluid to the turbine starter 1. The starter will then cease to deliver power to the engine so that it will become disengaged from the engine rotor through the action of the unidirectional or over-riding clutch 24 so that the engine is free to accelerate further while the starter comes to rest.

If for any reason whatsoever, the starter should become disengaged from the engine prematurely and combustion continues in the combustion chamber 18, the turbine speed would tend to increase very rapidly. The present arrangement operates to prevent this occurance by interrupting the fuel flow to the combustion chamber if and when the starter becomes disengaged from the engine rotor. When the starter is disengaged from the engine rotor, negligible torque is transmitted through the gears 9 and 10 so that the resulting axial reaction force on shaft 11 will be insufficient to keep the shaft displaced against the biasing force of the spring 12. The shaft will then cease to depress the switch contact button 14 thereby opening the electrical circuit through the switch 13. When the electrical circuit is interrupted, the solenoid 19 becomes de-energized so that the fuel shut-off valve 16 closes, thereby interrupting the flow of fuel through the conduit 17 to the combustion chamber 18. Combustion then ceases thereby limiting the maximum turbine speed to a safe value.

A second type of system for generating motive fluid for the turbine is known as the cartridge system. In the cartridge system, a charge of solid propellant of the type commonly used in rocketry is burned in a reloadable breech and the resulting hot gases are used as motive fluid. Referring to Figure 3, two charges 27 and 28 are shown in a reloadable breech 26. The charges 27 and 28 are located in separate portions of the breech and are separated by a one-way blow-out member 34 which is supported in the breech by an internal bracket 35. The one-way blow-out disk 34 is constructed so that it will rupture in response to a relatively low pressure in the portion of the breech which houses the main propellant charge 27, but will not rupture as easily in the other direction in response to fluid pressures in that portion of the breech which houses the charge 28. A conduit 31, provides fluid communication between the interior of the breech 26 and the turbine inlet 2. Two electrical squibs 29 and 29a serve to provide ignition of the propellant charges 27 and 28 respectively. The squibs 29 and 29a are connected electrically in parallel across a source of electrical energy by electrical conductors 32, 32a, and 32b. A normally open electrical starting switch 33 in the conductor 32 operates as a start switch. The switch 13 which is mounted adjacent the shaft 11, is connected in the branch circuit including conductors 32b and the squib 29.

Referring to Figures 1 and 3, the operation of the system shown therein is as follows. To initiate the starting cycle, the switch 33 is closed completing a series electrical circuit including the electrical source, conductors 32 and 32a and squib 29a. The resulting passage of electrical current through the squib 29a causes it to ignite, which in turn ignites the charge 28 either directly or through the ignition of a booster charge (not shown), if required. The charge 28 is designed so that a reduced quantity of gases produced by the combustion of the charge 28 is relatively low, and the resulting fluid pressure at the turbine inlet 2 will also be relatively low. Under these conditions the energy content of the motive fluid at the turbine inlet 2 will be low and the output power vs. speed characteristics of the turbine under these conditions will correspond to that indicated by the curve "a" in Figure 4.

Under these conditions, the maximum speed the starter can obtain is that indicated as $N_1$. Thus the unit will not overspeed if the clutch should fail to engage. Where the clutch does engage properly, a torque will be transmitted between gears 9 and 10 which causes the switch 13 to be closed in the manner described above. When the switch 13 is closed, an electrical current is caused to flow through conductors 32b and the squib 29 causing it to ignite, which in turn ignites the main charge 27 either directly or through the medium of a booster charge, if needed. The gases produced by the combustion of the main charge 27 are of sufficient quantity at a high enough pressure level to accelerate the engine rotor 25 (Figure 1) to its starting speed.

It will be understood that while the particular embodiments of the invention described herein relate to a turbine-type starter, it will be obvious to those familiar with the art that the invention is applicable to other types of turbomachinery and that various changes and modifications may be made without departing from the invention, and it is intended to cover in the appended claims all such changes and modifications that come within the true scope of the invention.

What I claim as new and desire to secure by Letters Patent of the United States is:

1. A control system for a turbomachine having a rotor and a gear train between said rotor and a load comprising a source of motive fluid capable of supplying fluid at two levels of energy content, means for initiating a flow of motive fluid from said source at a first low level of energy content, and means responsive to the transmission of torque through said gear train to initiate a flow of fluid from said source at a second higher level of energy content when said torque is greater than a preselected level.

2. In a turbostarter the combination of a rotor, a source of motive fluid for said rotor, gearing between said rotor and a load, said gearing comprising at least two meshed helical gears, first control means to initiate the flow of motive fluid from said supply to said rotor, and second control means responsive to an axial displacement of one of said helical gears resulting therethrough to initiate a flow of motive fluid from said supply to said rotor having an increased energy content.

3. In combination with a turbomachine having an inlet for motive fluid, a fluid rotor, and a gear train between said rotor and a load, the combination comprising a source of motive fluid for said fluid rotor comprising a combustor, fluid conduit means connecting said combustor and said inlet, means for supplying a combustible fluid to said combustor, means for supplying a combustion supporting fluid to said combustor, means for initiating a flow of said combustion supporting fluid to said combustor, said combustion supporting fluid flow having sufficient energy to create a torque in passing through said fluid rotor which is transmitted through said gearing to said load, and means responsive to the transmission of torque through said gearing to initiate a flow of said combustible fluid to said combustor.

4. Apparatus in accordance with claim 3 wherein said gearing comprises at least two meshed helical gears.

5. Apparatus in accordance with claim 3 wherein said torque responsive means comprise a control device mounted adjacent a member in said gear train which is actuated by an axial displacement of said member.

6. In combination with a turbomachine having a rotor and a gear train between said rotor and a load, a source of motive fluid for said rotor comprising an enclosure adapted to contain more than one charge of combustible solid material, and means to ignite at least one of said charges in response to the transmission of torque through said gearing.

7. Apparatus in accordance with claim 6 wherein said torque responsive means comprise a control device located adjacent a member in said gear train and adapted to be actuated by an axial displacement of said member.

8. In a turbostarter the combination of a rotor, gearing between said rotor and a load, said gearing comprising at least two meshed helical gears, a source of motive fluid for said rotor comprising a reloadable breech adapted to receive at least two charges of solid propellant, at least one of said charges being designed to provide motive fluid having a lower energy content than another of said charges, means for igniting said charge designed to provide motive fluid having the lower energy content, and means for igniting another of said charges, said last named means including a control device actuated by an axial displacement of a component of said gearing caused by the transmission of torque between two of said meshed helical gears.

References Cited in the file of this patent

UNITED STATES PATENTS

| | | |
|---|---|---|
| 2,248,245 | MacClain | July 8, 1941 |
| 2,262,022 | Lundquist et al. | Nov. 11, 1941 |
| 2,403,399 | Reggio | July 2, 1946 |

FOREIGN PATENTS

| | | |
|---|---|---|
| 137,550 | Sweden | Oct. 7, 1952 |